United States Patent [19]

Fukamachi

[11] Patent Number: 4,754,949
[45] Date of Patent: Jul. 5, 1988

[54] ACTUATOR FOR VALVE

[76] Inventor: Rikuo Fukamachi, No. 7-10, Kyomachibori 1-chome, Nishi-ku, Osaka, Japan

[21] Appl. No.: 93,950

[22] Filed: Sep. 8, 1987

[51] Int. Cl.[4] ............................................. F16K 31/05
[52] U.S. Cl. .......................... 251/129.03; 251/129.11; 251/129.12; 74/626
[58] Field of Search ................................ 74/626, 785; 251/129.12, 129.03, 129.11

[56]  References Cited

U.S. PATENT DOCUMENTS 4,526,060  7/1985  Watanabe .............................. 74/626
4,621,789  11/1986  Fukamachi ..................... 251/129.12

Primary Examiner—Arnold Rosenthal
Attorney, Agent, or Firm—Wenderoth, Lind & Ponack

[57]  ABSTRACT

The present invention relates to an actuator for valve capable of controlling the opening and closing of a valve by rotating the valve body, as well as the flow amount of a fluid passing through the valve by adjusting the opening degree of the valve body.

1 Claim, 3 Drawing Sheets

ACTUATOR FOR VALVE

BACKGROUND OF THE INVENTION

There is known an actuator for valve for rotating the body of a valve by a motor to control the opening and closing of the valve and for adjusting the opening degree of the valve body to control the flow amount of a fluid passing through the valve. Such conventional valve actuator requires a number of reduction gears for reducing the rotary speed of the motor to a suitable rotary speed of the valve body, making the entire apparatus large-sized. Also, the conventional valve actuator requires an expensive motor incorporating a brake mechanism for preventing the valve body from being rotated due to the pressure of a fluid passing through the valve when the motor as drive means is stopped rotating. This presents the disadvantage of increase in manufacturing costs.

SUMMARY OF THE INVENTION

It is an object of the present invention to eliminate the inconveniences of the conventional valve actuator by providing an economical actuator for valve in a compact design.

It is another object of the invention to provide an actuator for valve using a speed reduction mechanism incorporating internal gears which can provide a great reduction ratio without the use of a number of reduction gears.

It is a further object of the invention to provide an actuator for valve capable of using a motor having no brake mechanism, as drive means.

In order to achieve the objects above-mentioned, the present invention is proposed. The concrete arrangement of the invention will be further apparent from the following detailed description with reference to the accompanying drawings.

DETAILED DESCRIPTION OF THE INVENTION

Figure 1:
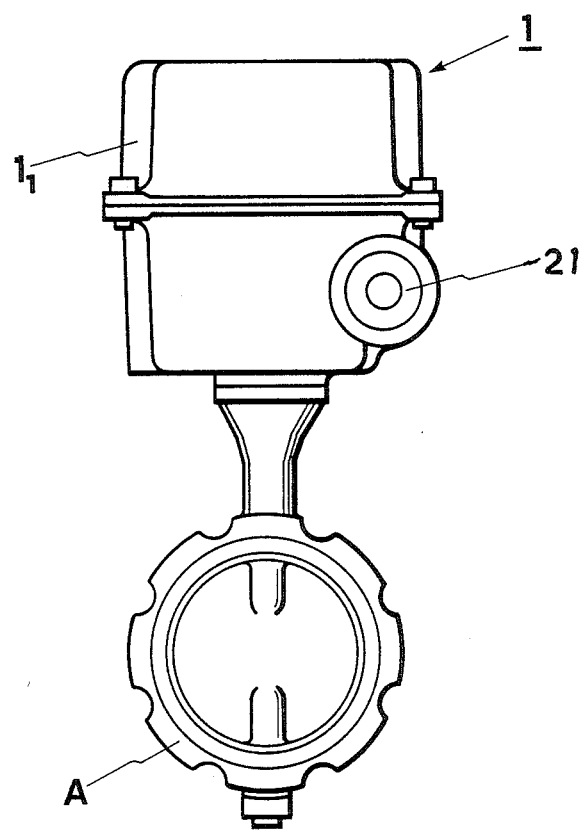
FIG. 1 is a side view of a valve on which the actuator in accordance with the present invention is mounted.
Figure 2:
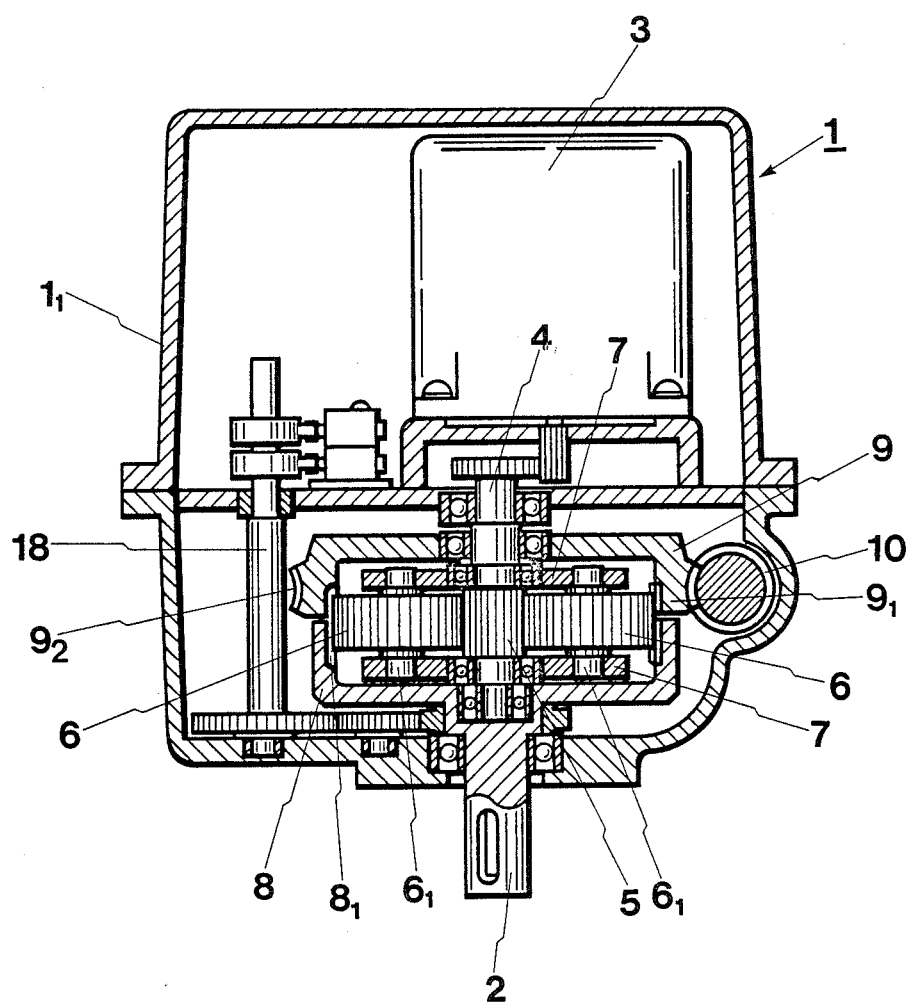
FIG. 2 is a vertical section view in side elevation of the actuator in FIG. 1.
Figure 3:
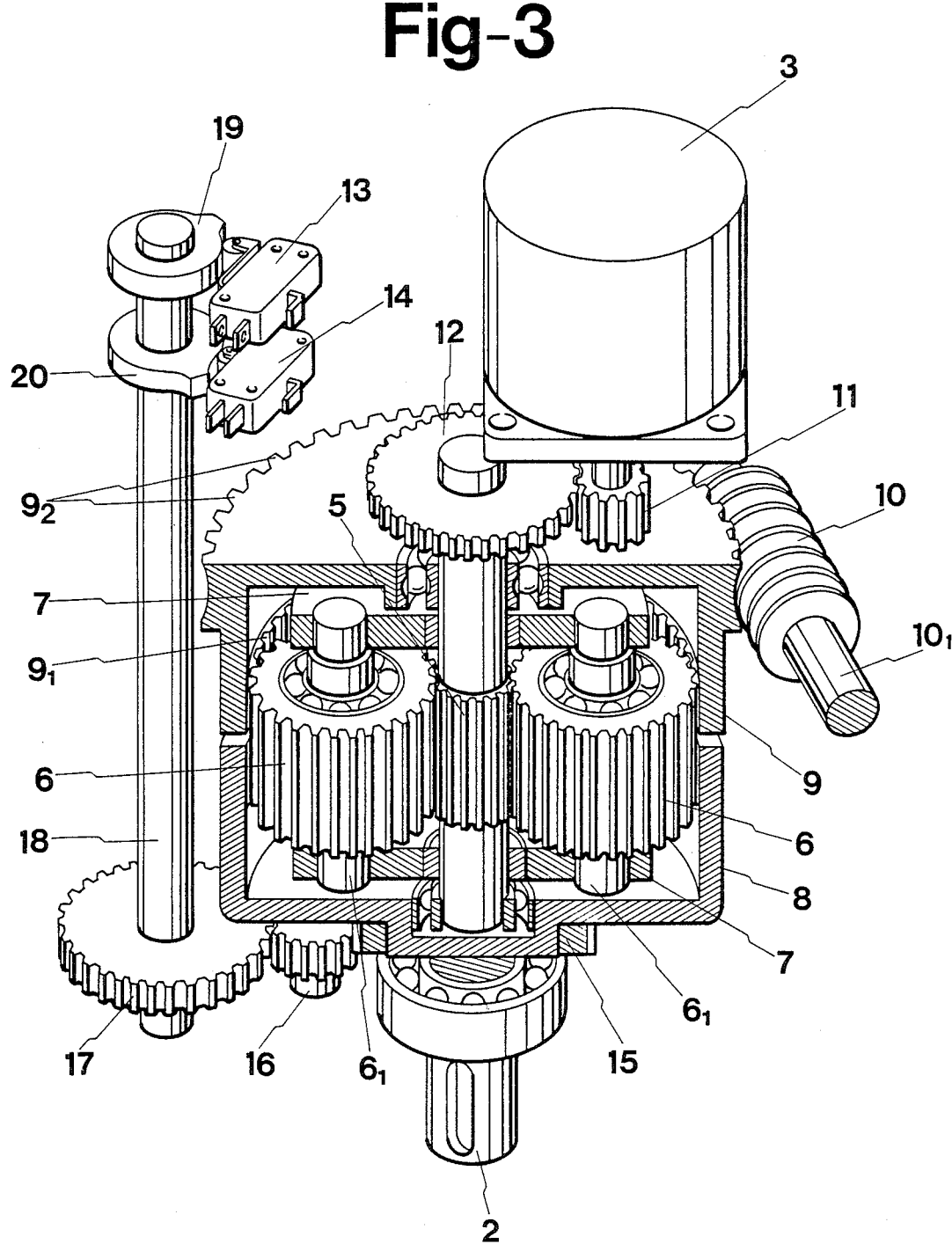
FIG. 3 is a perspectie view, with portions shown in vertical section, of main portions of the actuator in FIG. 1.

The present invention provides an actuator for valve 1 for opening and closing a valve A by rotating an output shaft 2 connected to a rotary shaft of the body of the valve A by 90° in forward and reverse directions by a reversible rotary motor 3. The valve actuator 1 comprises:

a rotary shaft 4 pivoted thereto on the extension line of the axis of the output shaft 2, said rotary shaft 4 adapted to be rotated by the motor 3;

gears 6 meshed with a gear 5 integrally secured to the rotary shaft 4;

plates 7 pivoted to the rotary shaft 4 for pivotally supporting the gears 6 at the shafts $6_1$ thereof;

an internal gear 8 having inner peripheral teeth $8_1$ meshed with the gear 6 and integrally secured to the output shaft 2;

an internal gear 9 having inner peripheral teeth $9_1$ commonly meshed with the gear 6 and pivoted to the rotary shaft 4, the number of the inner peripheral teeth $9_1$ being different from the number of the inner peripheral teeth $8_1$; and a regulating member 10 for preventing the internal gear 9 from being rotated.

To assure a stable pivotal support of the shafts $6_1$, a pair of plates 7 are disposed on and under the shafts $6_1$ of the gears 6. It is noted that a plurality of gears 6 are used. As the regulating member 10 for preventing the internal gear 9 from being rotated, there is used, in this embodiment, a worm gear meshed with the externalperipheral teeth $9_2$ of the internal gear 9.

The valve actuator of the present invention also includes reduction gears 11 and 12 for transmitting the rotation of the motor 3 to the rotary shaft 4, and limit switches 13 and 14 for detecting the rotation of the ouput shaft 2 to send the status of the valve A which is opened or closed, as an electric signal. The limit switches 13 and 14 are arranged such that their contacts are turned ON and OFF by cam plates 19 and 20 integrally secured to a rotary shaft 18 which is rotated through gears 15, 16, and 17.

A manual handle 21 is disposed outside of a casing $1_1$ of the actuator 1 and attached to the extension end of a rotary shaft $10_1$ of the regulating member or worm gear 10.

The following description will discuss the usage and operation of the actuator in accordance with the present invention with reference to the embodiment thereof illustrated in the drawings.

In use, the output shaft 2 of the actuator 1 is mounted on the rotary shaft of the valve body such that the actuator 1 is connected to the valve A in a unitary structure.

In a state where the valve A is closed, when the motor 3 is rotated in such direction as to open the valve, the rotary shaft 4 is rotated through the reduction gears 11 and 12, thereby to rotate the gears 6 meshed with the gear 5 integrally secured to the rotary shaft 4. The upper half portions of the gears 6 are meshed with the inner peripheral teeth $9_1$ of the internal gear 9 of which the outer peripheral teeth $9_2$ are meshed with the worm gear 10 to prevent the internal gear 9 from being rotated. Accordingly, the gears 6 effect a so-called planetary movement in which the gears 6 move around the gear 5 while rotating on their own axes. Consequently, the plates 7 are pushed by the shafts $6_1$ of the gears 6 and rotated independently from the rotary shaft 4. On the other hand, the lower half portions of the gears 6 are meshed with the inner peripheral teeth $8_1$ of the internal gear 8 integrally secured to the output shaft 2. Accordingly, upon rotation of the plates 7, the gears 6 are rotated while meshing with the inner peripheral teeth $8_1$. However, the number of the inner peripheral teeth $8_1$ of the internal gear 8 is different from the number of the inner peripheral teeth $9_1$ of the internal gear 9. Therefore, while the gears 6 make one revolution round the gear 5 or the plates 7 make one revolution, the internal gear 8 is rotated as pushed by the gears 6 by a distance corresponding to the difference in the number of teeth.

For example, when the number of the inner peripheral teeth $8_1$ is 100 and the number of the inner peripheral teeth $9_1$ is 98, the internal gear 8 rotates by a distance corresponding to the difference in the number of teeth, i.e., two teeth, or a 2/100 revolution, while the plates 7 make one revolution. By this rotation of the internal gear 8, the output shaft 2 integral therewith is rotated, thereby to rotate the valve A in the valve opening direction. When the valve body is opened by the 90°-rotation of the output shaft 2, the contacts of the limit switch 13 are turned OFF to disconnect power to the motor 3 to stop the rotation of the motor 3.

When desired to close the valve A, the motor 3 is energized in such direction as to close the valve. The rotary shaft 4 is then rotated to rotate the gear 5 and the gears 6 reversely. The gears 6 effect a planetary movement in the direction opposite to the direction above-mentioned, causing the plates 7 to be rotated in the reverse direction to rotate the internal gear 8 in the reverse direction. Accordingly, the output shaft 2 is rotated by 90° to close the valve A body. Simultaneously with the closing of the valve body, the contacts of the limit switch 14 are turned OFF to disconnect power to the motor 3 to stop the rotation of the motor 3.

Afterwards, by the driving operation of the motor 3, the operations above-mentioned are repeated to control the opening and closing of the valve A.

When the valve A is apt to rotate due to the pressure of a fluid passing through the valve A at a time when the motor 3 is stopped in a state where the valve A is opened, closed or semi-opened, such force of rotation is transmitted to the output shaft 2. Then, the internal gear 8 integral with the output shaft 2 is apt to rotate. However, the gears 6 meshed with the inner peripheral teeth $8_1$ of the internal gear 8 also mesh with the inner peripheral teeth $9_1$ of the internal gear 9 of which outer peripheral teeth $9_2$ are meshed with the worm gear 10 to prevent the rotation of the internal gear 9. Therefore, the internal gear 8 cannot be rotated, whereby the output shaft 2 cannot be rotated.

More specifically, since no turning force is transmitted to the gear 5 meshed with the gears 6, the rotary shaft 4 or the rotary shaft of the motor 3 is not rotated. Accordingly, even if the motor 3 is not provided with a brake mechanism, there is no likelihood that the valve A is rotated due to the pressure of a fluid at a time when the motor 3 is stopped rotating.

In accordance with the actuator for valve of the present invention, two internal gears having inner peripheral-teeth the numbers of which are different from each other, are combined with gears meshed with both inner peripheral teeth of these internal gears to form a reduction mechanism having a great reduction ratio and a so-called irreversible transmission mechanism so adapted as not to transmit a rotation force in a reverse direction. Accordingly, the valve actuator of the present invention does not require a number of gears for providing a great reduction ratio as would be the case with a conventional reduction mechanism including the combination of spur gears. Therefore, the actuator of the present invention can be made in a compact design in its entirety. Further, by the elimination of a motor incorporating a brake mechanism, the actuator can be manufactured with reduced costs.

As shown in the embodiment, in order to prevent the rotation of the internal gear 9, the worm gear 10 meshed with the outer peripheral teeth $9_2$ is disposed. This worm gear 10 may be so arranged as to be rotated by the operation of an external handle. Accordingly, even if the valve A cannot be controlled by the motor 3 due to power failure, the handle 21 can be rotated to rotate the internal gear 9. Through the gears 6 meshed with the internal gear 9, the internal gear 8 or the output shaft 2 can be rotated, whereby the opening and closing of the valve A can be controlled. This presents a great practical advantage.

What is claimed is:

1. In an actuator for valve (1) for opening and closing a valve (A) by rotating an output shaft (2) connected to a rotary shaft of the body of said valve (A) by 90° in forward and reverse directions by a reversible rotary motor (3),
    said actuator for valve (1) comprising:
    a rotary shaft (4) pivoted thereto on the extension line of the axis of said output shaft (2), said rotary shaft (4) adapted to be rotated by said motor (3);
    gears (6) meshed with a gear (5) integrally secured to said rotary shaft (4);
    plates (7) pivoted to said rotary shaft (4) for pivotally supporting said gears (6) at the shafts ($6_1$) thereof;
    an internal gear (8) having inner peripheral teeth ($8_1$) meshed with said gear (6), and integrally secured to said output shaft (2);
    an internal gear (9) having inner peripheral teeth ($9_1$) commonly meshed with said gear (6), and pivoted to said rotary shaft (4), the number of said inner peripheral teeth ($9_1$) being different from the number of said inner peripheral teeth ($8_1$); and
    a regulating member (10) for preventing said internal gear (9) from being rotated.

* * * * *